United States Patent
Chup

(10) Patent No.: US 7,322,469 B2
(45) Date of Patent: Jan. 29, 2008

(54) CONTAINER FOR RECORDING MEDIA

(75) Inventor: Gregory Chup, Old Bridge, NJ (US)

(73) Assignee: International Paper Company, Memphis, TN (US)

(*) Notice: Subject to any disclaimer, the term of this patent is extended or adjusted under 35 U.S.C. 154(b) by 71 days.

(21) Appl. No.: 11/059,809

(22) Filed: Feb. 17, 2005

(65) Prior Publication Data
US 2006/0180485 A1    Aug. 17, 2006

(51) Int. Cl.
*B65D 85/57*    (2006.01)
(52) U.S. Cl. .................. 206/308.1; 206/312; 206/474; 220/4.24
(58) Field of Classification Search ............. 206/308.1, 206/303, 493, 232, 472, 308.2, 309, 310, 206/311, 312, 1.5, 307, 474; 220/4.21, 324, 220/326, 4.24; D6/407, 629, 634; 70/63
See application file for complete search history.

(56) References Cited

U.S. PATENT DOCUMENTS

| | | | |
|---|---|---|---|
| 5,551,589 A * | 9/1996 | Nakamura | 220/326 |
| 5,605,227 A * | 2/1997 | Morita | 206/387.1 |
| 6,315,142 B1 * | 11/2001 | Kitamura et al. | 220/4.02 |
| 6,332,533 B1 * | 12/2001 | Howisen | 206/307.1 |
| 6,685,022 B2 | 2/2004 | Sullivan | |
| 2001/0021167 A1 * | 9/2001 | Kutaragi et al. | 369/291 |
| 2003/0146119 A1 * | 8/2003 | Lee | 206/310 |
| 2004/0134807 A1 * | 7/2004 | Westmeyer et al. | 206/308.1 |
| 2006/0005587 A1 * | 1/2006 | Necchi | 70/57.1 |

FOREIGN PATENT DOCUMENTS

| | | |
|---|---|---|
| WO | WO 01/48757 | 7/2001 |
| WO | WO 2004/042733 | 5/2004 |

* cited by examiner

Primary Examiner—Mickey Yu
Assistant Examiner—Steven A. Reynolds
(74) Attorney, Agent, or Firm—Matthew M. Eslami

(57) ABSTRACT

A container for recording media, such as disk(s) includes first and second essentially identical trays. Each tray is adapted to releasably receive a disk for protective storage. The trays are oriented in overlying and registered relationship to one another and affixed to one surface of a sheet, such as paperboard, in side-by-side relationship. The trays are spaced apart from one another on the sheet to define a spline area of the sheet between the adjacent sides of the trays. Each tray includes unique respective male and female latch means for releasably securing the trays in a closed attitude.

10 Claims, 6 Drawing Sheets

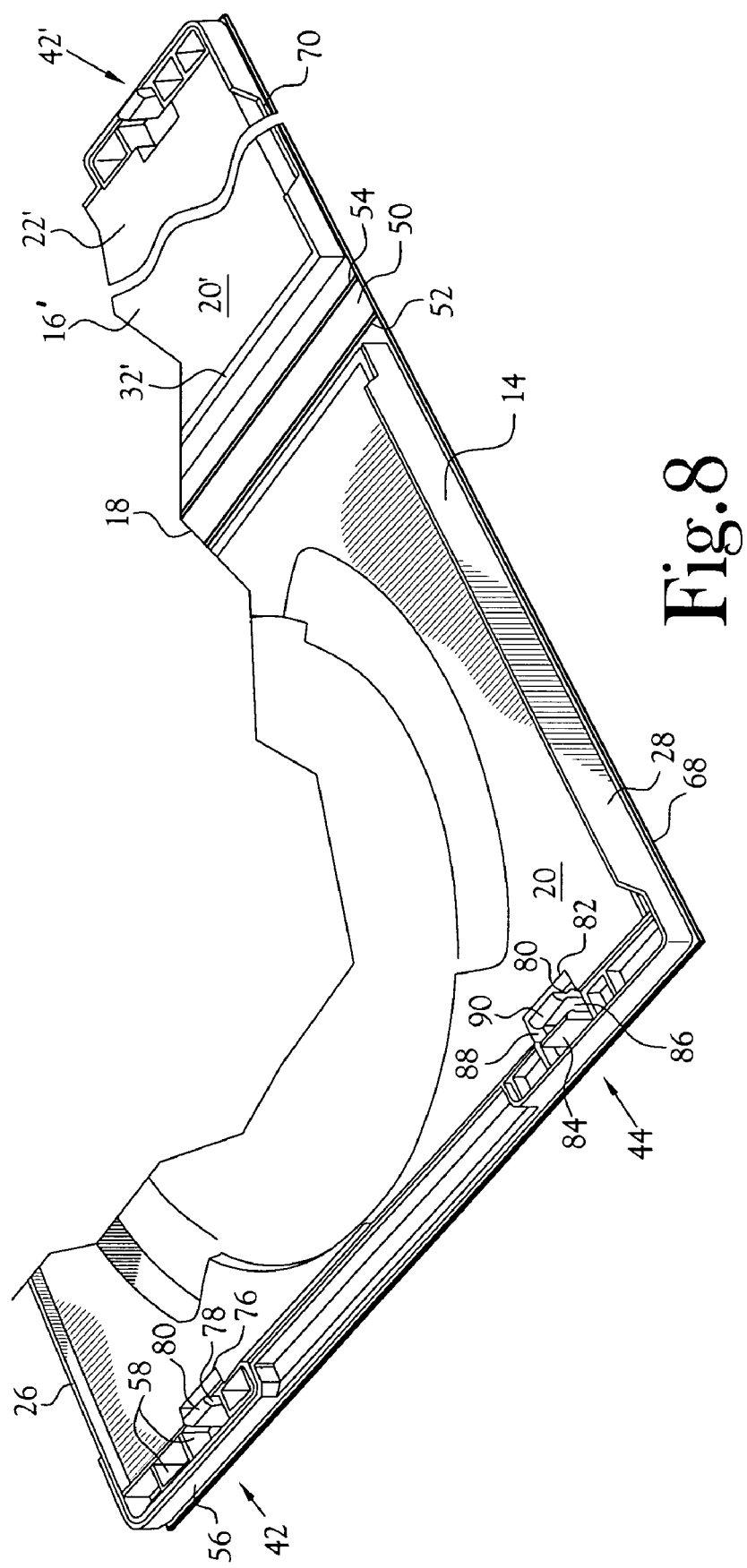

CONTAINER FOR RECORDING MEDIA

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Recording media has vastly multiplied in recent times, to the extent that providing storage means for individual ones of the media in a manner that protects the media from damage and destruction or deterioration of the information recorded on the media, has become a major industry.

One of the more common types of storage products for recording media of the disk type are the "clam shell" containers. These containers comprise at least one tray (or envelope) which is removably disposed within a front and back cover. The covers for these containers vary widely in design and/or structure, but in each instance, the concept is to house the disk(s) between protective hinged top and bottom covers, these being somewhat akin to hinged clam shells, hence the appellation "clam shell" containers.

In the prior art, it is known to form plastic containers comprising top and bottom hinged trays, wherein one or both of the trays are provided with means for releasably securing a disc thereon. Also in the prior art, it is known to mount these trays on a "book cover" such that the trays effectively become pages in a book. Both the hinged trays and the "book" type containers suffer from problems relating to the ready opening and closing of the container. Ribbons tied about the girth of the closed container halves, "hook and loop" means, and other devices has been offered as means for releasably holding the container halves together. Such devices are less than desirable with respect to their ease of use. Mating latch elements on the container halves have been offered as a solution to closing and opening the container to gain access to the disk(s) stored inside the container. Particularly, heretofore, the means employed to latch the hinged elements of the container to one another when in the folded (closed) attitude either are difficult to place in register to effect latching and/or do not hold the container halves closed in a manner which requires inordinate efforts to open the container. It has also been proposed that latch means be provided on more than one side of the container halves, each latch being relatively weak in holding power, but with the combination of latches being sufficiently strong to hold the container closed during normal use. Unfortunately, this concept suffers from racking of the container halves as the first latch is loosed, then the second latch is loosed, and so on. Over time, these latches tend to fail.

BRIEF SUMMARY OF THE INVENTION

In accordance with one aspect of the present invention there is provided a book-type container for recording media, such as disk(s), comprising first and second essentially identical trays, each tray being adapted to releasably receive a disk for protective temporary storage. In the present invention, the trays are affixed to one surface of a sheet, such as paperboard, in side-by-side relationship, the trays being spaced apart from one another on the sheet with their respective rear side walls facing one another to define a spline area of the sheet between the facing rear side walls of the trays. Upon folding of the sheet back upon itself, the trays assume an overlying registered relationship to one another with their respective top surfaces facing one another, and with the top end of the first tray being in register with the bottom end of the second tray.

Each of the trays of the present invention includes a bottom having first and second substantially planar opposite surfaces. One surface is adapted to affix the tray to the sheet. The opposite surface includes upstanding projections about the periphery of the tray which define top and bottom and opposite front and rear side walls of the tray. In accordance with one aspect of the present invention, the top wall of each of the trays extends to a further height above the top surface of the tray than the height of the bottom wall of such tray. When the trays are disposed in overlying relationship, the top wall of the first tray nests alongside the bottom wall of the second tray, and the top wall of the second tray nests outside the bottom wall of the first tray, thereby imparting rigidity of alignment of the trays when the trays are in their "closed" attitude.

In a further aspect of the present invention, each tray is provided with a male and a female latch means, these latch means being spaced apart from one another along the length of the respective front side walls of the trays. The rear side wall of each tray is void of latch means. When the trays are "closed", the outboard edges of the rear side walls and the outboard edges of the front side walls of the trays abut one another to limit the extent of closure of the trays.

The latch means of the trays of the present invention are unique in their structure and consequential functioning thereof. Each latch includes a housing defined in the bottom of a respective one of the trays. This housing includes a bottom and opens outwardly to the top surface of the tray. The housing for a male latch element houses a planar blade-type projection therein, which projection terminates at a level slightly above the top surface of the tray. The housing for a female latch element houses first and second planar blade-type projections which extend from the bottom of their housing upwardly and terminate at a level slightly above the top surface of the tray. These planar projections are spaced apart by a distance sufficient to frictionally receive therebetween a blade projection from a male latch means. Each tray includes a male and a female latch means disposed on its respective front side wall so that when the trays are closed, the male latch means of one tray comes into register with and frictionally engages a female latch means of the other tray to effect latching of the two trays to one another in their closed positions. Release of the latches is effected by applying an opening force at a location central of the overlying front side walls of the trays and between their respective latch means such that this single application of force effects substantially simultaneous disengagement of the latches, with concomitant reduction of racking of either of the trays.

DETAILED DESCRIPTION OF THE INVENTION

Referring initially to FIG. 8, the container of the present invention comprises first and second trays 14,16, respectively mounted on a paperboard sheet 18 (see also FIG. 2) in registration with one another and latched in their closed relationship to one another.

Figure 1:
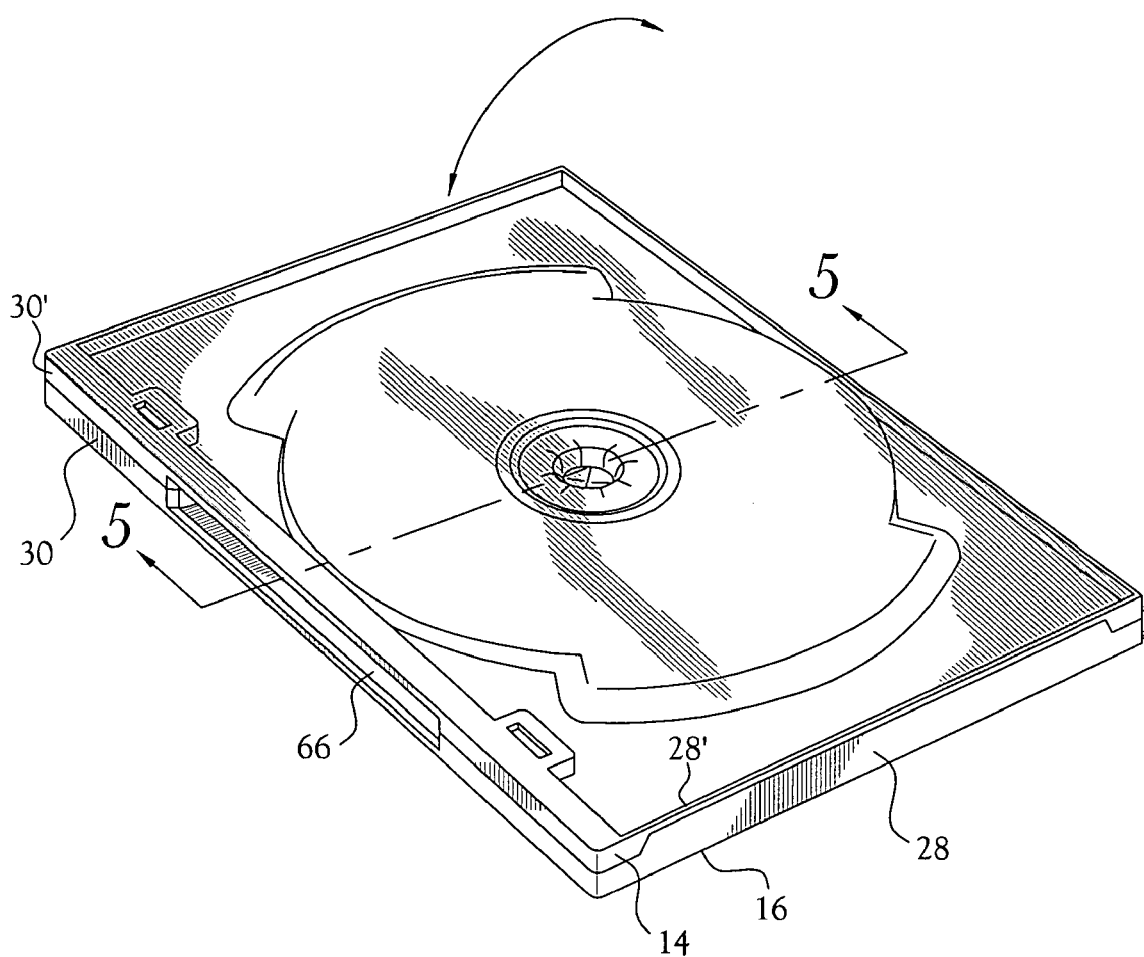
FIG. 1 is a perspective view of first and second trays of the present invention disposed in overlying and registering attitude.
Figure 2:
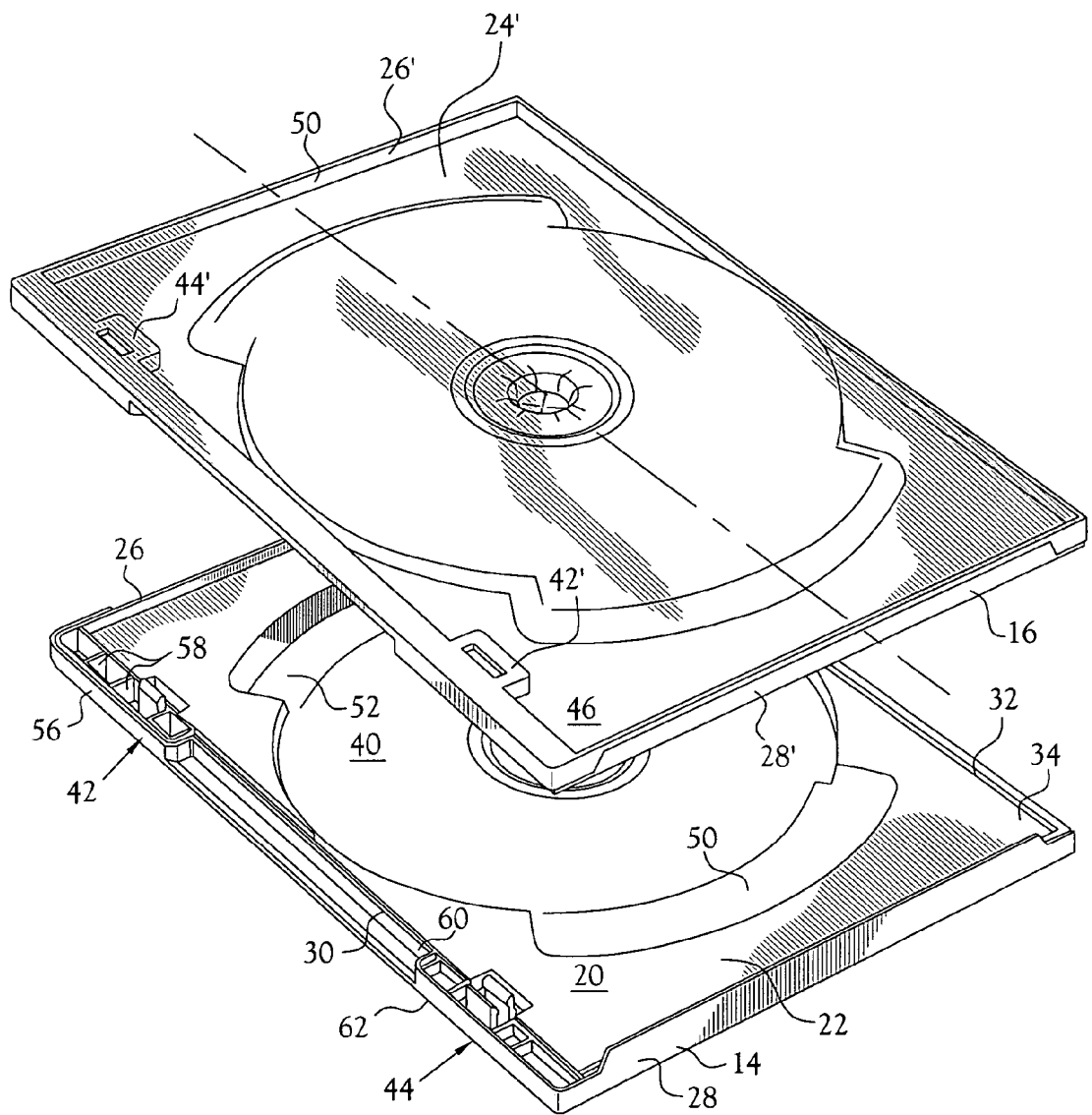
FIG. 2 is a representation of first and second trays of the present invention prior to their disposition in overlying and registering attitude.

In FIG. 1, there are depicted first and second trays 14,16, respectively disposed in their overlying and registered attitude without a covering sheet. In FIG. 2, these same first and second trays are depicted as individual trays positioned for being disposed in overlying and registering relationship to one another.

Referring to FIG. 2, in the depicted embodiment of the first and second trays of the present container, the first and second trays are essentially identical in design and structure. As will be apparent hereinafter, the orientation of the first tray relative to the second tray in accordance with the present invention provides for identical trays, formable employing a single mold, to be employed in a manner wherein various features of each tray are complementary to various features of the other of the trays and thereby define a novel container of the present invention. As appropriate, primed numerals are employed to identify like elements in the first and second trays.

Figure 3:
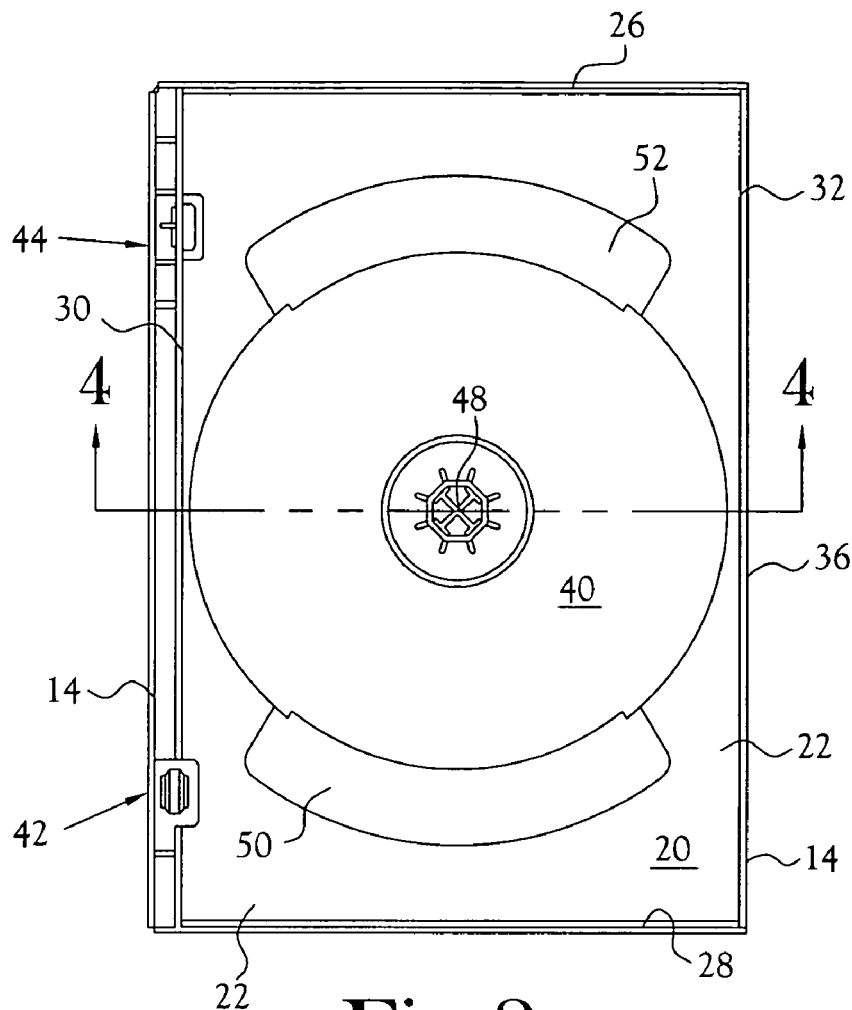
FIG. 3 is a top plan view of a disk-receiving tray embodying various of the features of the present invention.
Figure 4:
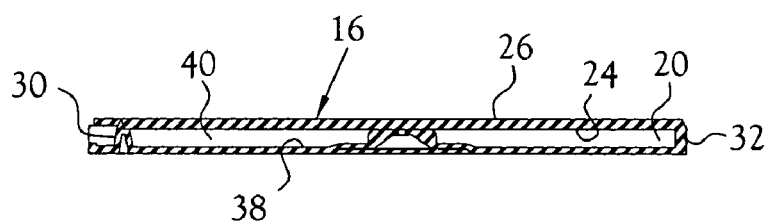
FIG. 4 is a sectional view of the tray of FIG. 3 and taken generally along the line 4-4 of FIG. 3.

Referring initially to the first tray 14 as depicted in FIGS. 2, 3 and 8, this first tray is rectangular and substantially of a planar geometry. This first tray 14 (depicted top surface 20 up in FIGS. 2 and 3) includes a generally planar bottom 22 having a top surface 20 and a generally planar and parallel bottom surface 24. (See also FIG. 4) Top and bottom walls, 26 and 28, respectively, and 20 first (front) and second (rear) opposite side walls, 30 and 32, respectively, extend from the top surface about the perimetral margin 34 of the bottom 22 of the first tray.

Referring to FIGS. 2 and 8, the top surface 20 of the first tray 14 includes top and bottom walls 26, 28 respectively, and front and rear opposite side walls 30, 32 respectively, extending from the top surface 20 of the first tray. These walls on the top surface of the first tray are not of equal heights above the top surface 20 of the first tray. Rather, the top wall 26, the rear wall 32, and a major portion of the front wall 30 of the first tray extend from the top surface of the first tray to equal heights. The height of the bottom wall 28 is greater than the height of the top wall 26 of the first tray. Moreover, the top wall 26 of the first tray is offset inwardly from the perimetral margin of the top end of the first by a distance essentially equal to the thickness of the bottom wall of the first tray, so that when the first and second trays are oriented and brought into overlying and registered relationship to one another with their top surfaces facing one another, the bottom wall 28 of the first tray 14 is oriented alongside and outside the top wall 26' of the top surface of the second tray 16', and the bottom wall 28' of the second tray 16' is oriented alongside and outside the top wall 26 of the first tray 16.

The front side wall 30 on the top surface 20 of the first tray 14 is somewhat discontinuous. This front side wall at its maximum height, extends from the top wall 26 of the first tray toward the bottom wall 28 a distance of about one-half of the total distance between the top and bottom walls of the top surface 20 of the first tray, whereupon the height of this front wall is reduced by about one-half, and continues at such reduced height a distance equal to about one-fourth of the overall distance between the top and bottom wall of the first tray.

A first stub wall 56 extends from the top wall 26, parallel and spaced outboard of the front side wall of the first tray by, a distance of about one-fourth of the length of the overall distance between the top and bottom walls on the top surface of the first tray. This stub wall is provided with cross partitions 58 between the stub wall and the adjacent front wall 30 to provide reinforcement of that portion of the length of the front wall along which the stub wall extends. In the depicted embodiment, a male latch element 42 is integrated into the stub wall 56 and that portion of the front side wall 30 along which the stub wall 56 extends.

The front side wall on the top surface of the first tray terminates at a location about three-fourths of the distance between the top and bottom walls of the first tray. Within this final fourth of the distance between the top and bottom walls of the first tray, there is provided a second stub wall 57, substantially like the aforesaid first stub wall, and extends from the terminal end 60 of the front wall of the tray along the outer perimetral edge 62 of the first tray. In the depicted embodiment, a female latch means 44 is integrated with the second stub wall, portions of such latch means projecting above the height of the stub wall and in position to frictionally receive a complementary element of a male latch mean located on a second tray when the second tray is overlaid in register with the first tray as may be seen in FIGS. 1, 2, 7 and 8, specifically.

Centrally of the top surface 20 of the first tray there is defined a generally circular depression 40 which opens outwardly from the top surface 20 of the first tray and in which a disk (not shown) may be removably stored. Centrally of this depression there is provided a post 48 adapted to removably secure a disk within the depression. As noted hereinabove, the bottom portion 38 of this depression projects through the bottom of the first tray. At spaced apart locations about the circumference of the circular depression, there are provided one or more concavites 52, 50, 52 suitable for insertion of the end of a user's finger therein and under a disc held in the depression, for the application of a removal force against the disk. As desired, these concavities may be sized to receive a single finger end or to receive multiple finger ends.

Along the length of the front side wall 30 of the first tray there are provided first and second latch means 42 and 44, respectively, which are integrated into the front side wall of the first tray at spaced apart locations along the front side wall. Preferably, one latch means 42 is located adjacent the top wall 26 of the tray and the other 44 of the latch means is located adjacent the bottom wall 28 of the tray, ie., adjacent opposite ends of the front side wall. As depicted, the first 42 of these latch means is designated a male latch means and the second 44 is designated a female latch means.

With specific reference to FIG. 8, each male latch means 42 of the present container comprises a housing 76 which is integrated with that end of the front side wall 30 and its accompanying first stub wall 56 (tray 14 for example). Within this housing there is provided a planar blade-type projection 78 which extends perpendicularly from the bottom 22 of the tray. In the preferred embodiment, this planar blade-type projection is oriented substantially parallel to and aligned with, its respective front side wall. Preferably, the distal end of the projection is provided with an enlarged edge 80 which serves as a means for locking the projection with a female latch means.

Along the front side wall of the tray adjacent the bottom wall 28 of the tray, and opposite the male latch means adjacent the top wall of the tray, there is provided a female latch means 44. Each such female latch means includes a housing 82 integrated with the top surface of the tray. Within this housing there are provided first and second planar blade-type projections 84, 86 which extend perpendicularly from the top surface of the tray. Further, they are coplanar but spaced apart from one another by a distance sufficient to effect frictional receipt therebetween of the blade-type projection of a male latch means. The space 88 defined between the first and second projections is aligned with the front side wall of the tray and thereby in position to readily be aligned with, and receive therein, a blade-type projection of a registered male latch means. As desired, a shoulder 90 may be provided along the distal end of one or both of these first and second projections to serve as a co-acting locking element for the enlarged distal edge of a male latch means.

Recognizing that the first 14 and second 16 trays are essentially identical in geometry, including size, (the trays preferably being of a plastic material and formed in the same mold) the description of the first tray given above is equally applicable to the second tray, hence need not be repeated in full detail as for the second tray.

Specifically, the second tray 16 includes a bottom 22' having a top surface 20' and a bottom surface 24', perimetral top and bottom walls 26', 28' respectively, and first (front) and second (rear) side walls 30', 32' respectively. As in the first tray, in the second tray there are provided male 42' and female 44' latch means disposed in spaced apart relationship along the length of the front side wall 30' of the second tray. As noted above, when the first and second trays are disposed in overlying and registered relationship to one another, the male latch means 42 on the first tray 14 registers with the female latch means 44' on the second tray, and the female latch means 44 on the first tray register with the male latch means 42' on the second tray, thereby providing for frictional releasable interconnection of the first and second trays at locations along their respective front side walls and adjacent their respective top and bottom walls.

Figure 6:
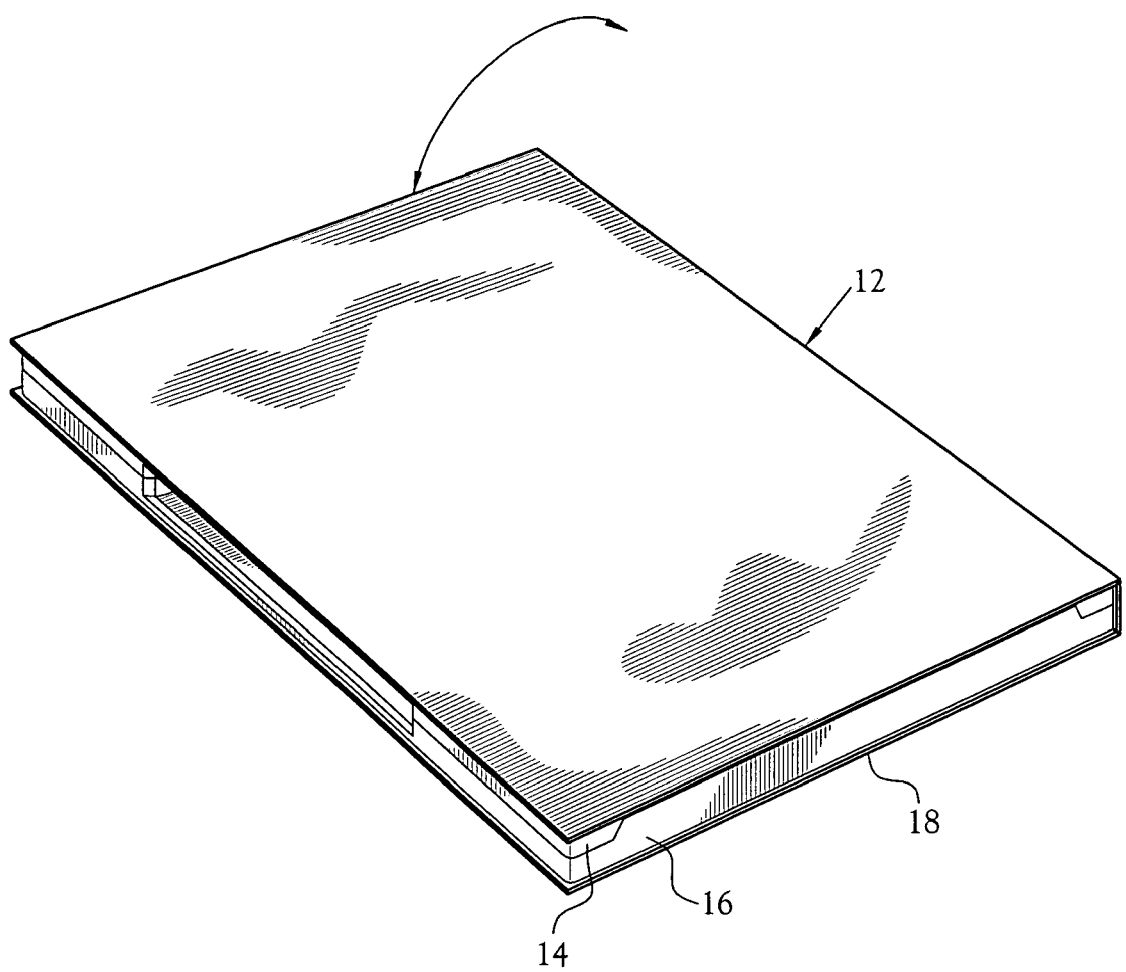
FIG. 6 is a representation of first and second registering trays mounted on a paperboard sheet to define a book-type container of the present invention.
Figure 7:
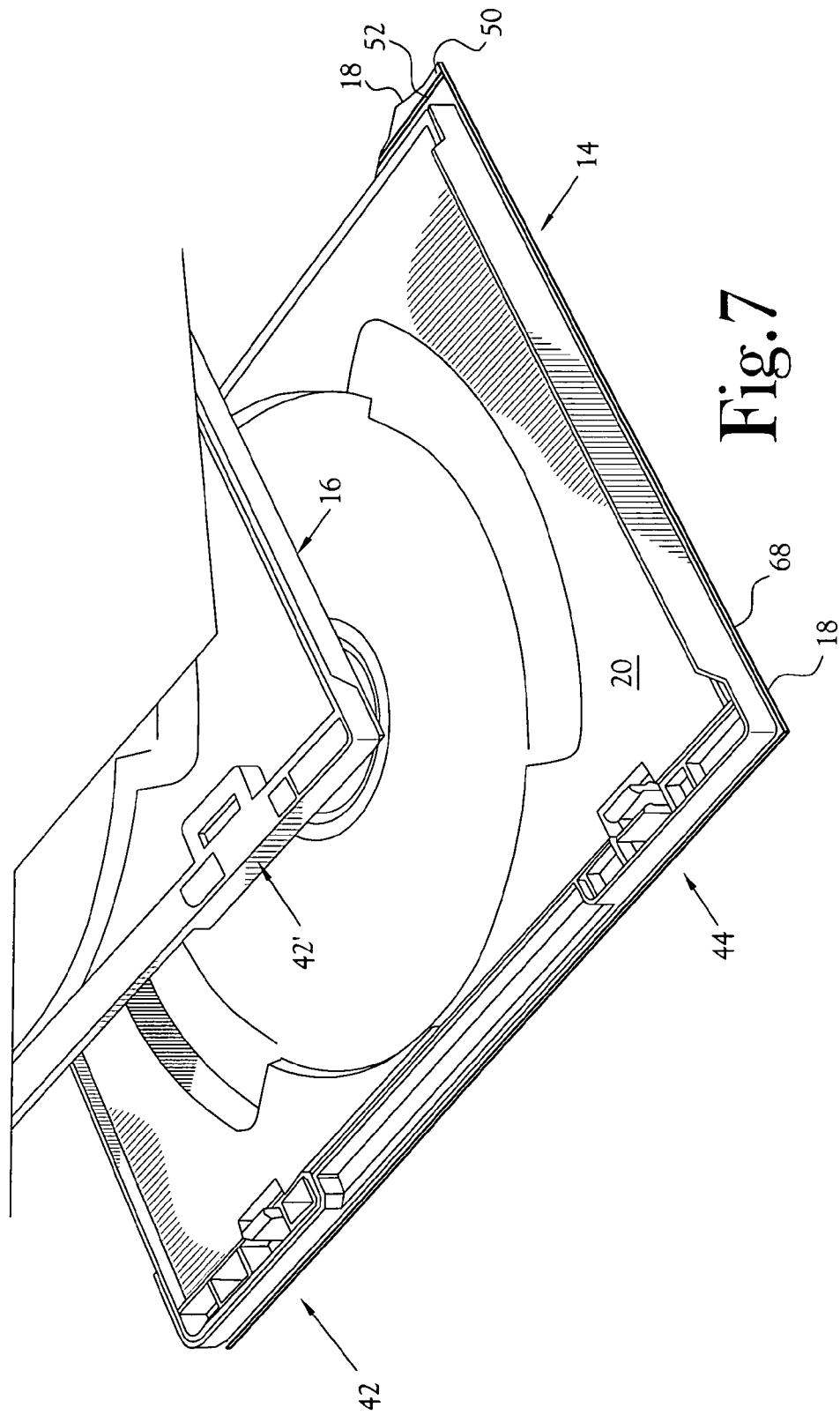
FIG. 7 is an enlarged view of a portion of the first and second trays of FIG. 2 and particularly depicting the latch means of the present invention; and, FIG. 8 is a fragmentary view depicting the positioning of first and second trays on a supporting sheet.

Referring to FIGS. 1, 6 and 7 in particular, by reason of the reduced height of a portion of the front side wall of each tray, when the trays are disposed in overlying and registered relationship, these walls do not engage one another. Rather, they are separated in the region thereof between their respective male and female latch means, providing a form of cutout 66 for the insertion of the user's fingers for purposes of application of a force sufficient to release the latch means and swing the trays to open positions wherein the user may retrieve one or both of the disks stored within the container.

In the embodiment depicted in FIG. 2, a container of the present invention includes a first tray which is essentially identical to a second tray 16. In accordance with the present invention, the first and second trays, each housing a disk or only a single disk in one of the trays, are adapted to be positioned in overlying and registering relationship to one another, to define a subassembly of the container of the present invention.

To effect assembly of the container, either the second tray or the first tray, as depicted in FIGS. 3 and 8, is positioned on one end 68 of the sheet 18 with its top surface 20 facing upward from the sheet and the other tray 16, with its top surface 20' (FIG. 8) facing downward toward the top surface 20 of the first tray positioned on the opposite end 70 of the sheet and in spaced apart relationship to the first tray. Further, the rear walls 32, 32' of the trays are positioned parallel to, but spaced apart from one another, thereby defining a spline 50 between these walls of the two trays. As desired, score lines 52 and 54 may be provided in the spline to facilitate folding of the sheet, and the trays carried thereon, about the spline. The orientation of the trays on the sheet also positions the male latch means in position to register with the female latch means of the other of the trays, when the sheet with the trays affixed thereto, is folded along the score lines to bring the first and second trays into overlying and registered relationship to one another and with their respective top surfaces facing one another. This infolding of the sheet and trays serves to further releasably lock the two trays to one another (FIGS. 7 and 8) with one or more disks disposed within the respective depressions of the trays and define a book type container as is depicted in FIG. 6. Further, upon folding of the sheet to bring the first and second trays into overlying and registered relationship, the bottom wall of the first tray becomes positioned alongside and inwardly of the top wall of the second tray, thereby further enhancing the resistance of the trays to racking and concomitant deregistration.

This orientation of the first and second trays relative to one another permits the use of identical trays as opposed to requiring the design and manufacture, etc., of first and second trays having respective different design features.

Figure 5:
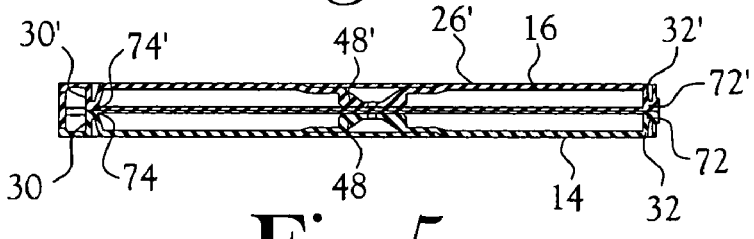
FIG. 5 is a sectional view of the first and second registered trays of FIG. 1 and taken generally along the line 5-5 of FIG. 1.

FIG. 5 is a sectional view of first and second trays disposed in overlying and registered relationship taken generally along the line 5-5 of FIG. 1. In FIG. 5, it will be seen that the outboard edge 72 of the rear side wall 32 of the first tray 14 overlies and engages the outboard edge 72' of the rear side wall 32' of the second tray 16. In like manner, as seen in FIGS. 1 and 5, the respective outboard edges 74, 74' of the front side walls 30, 32' respectively, of the two trays are in register and engage one another when the two trays are disposed in overlying and registered relationship to one another, thereby, establishing parallelism and registration between the two trays, resistance to racking of the two trays (as by the interlocking relationship of the top and bottom walls of the two trays), and, importantly, uniform spacing of the two trays apart from one another by a minimum distance which precludes a component of either tray from engaging and possibly damaging a disk stored in the second tray. In a preferred embodiment, this minimum spacing between the two trays is about 1.4 mm. and is so maintained over essentially the entire facing areas of the two trays.

Assembly of the first and second trays into a complete container includes provision of a sheet of material, preferably paperboard, having a rectangular area sufficient to receive the two trays on one surface of the sheet in side-by-side relationship, but with a central space remaining between the adjacent rear walls of the two trays. This initial alignment and affixation of the trays on the sheet may be achieved by machinery known in the art, or by use of a template, also known in the art. Such spacing defines a spline about which the two trays affixed to the sheet may be folded into overlying and registered relationship between opposite end of the sheet, all in the form of a book type container. Affixation of the trays to the sheet may be by any of several methods known in the art, such as adhesive.

As noted hereinabove, when the first and second trays are assembled on the unfolded sheet, each of the top surfaces of the two trays is facing outwardly from the underlying sheet. Further, the rotational orientation of one tray on the sheet with respect to the other of the trays, thereafter positions the rear wall of one tray facing the rear wall of the other of the trays. As so oriented and affixed to the sheet, when the sheet is folded about its spline, the top surfaces of the two trays face one another. Also as noted, this orientation of the trays provides for the use of two identical trays for formation of the container of the present invention. Further, by reason of the design of the top and bottom walls of each of the essentially identical trays, when the one tray is rotated about its center, such that the top wall of such tray comes into register and mating relationship with the bottom wall of the other of the trays, thereby enhancing registration of the two trays and enhancing of the resistance of the overlaid trays to racking motion.

Still further, the present location and orientation of the male and female latch means only on the respective overlying front side walls of the two trays eliminates distortion (rocking) of the trays and their sheet cover as occurs when latch means are also located on the overlying rear side walls of the trays. In their latter configuration of front and rear latch means, after front latch means have been disengaged to initiate separation of the two trays in the course of opening of the container, the opening force applied to the front wall latch is redirected unevenly against the rear wall latch means.

Whereas the present invention has been described employing specific and preferred structural details, it will be recognized that other equivalent structural details may be employed without departing from the essence of the invention as set forth in the Claims appended hereto.

What is claimed:

1. A container for the protective storage of recording media in the form of a disk, comprising a planar sheet of material having first and second opposite ends, and a spline defined between said opposite ends, first and second essentially identical trays, each having a top surface and respective rear side walls, affixed to respective opposite ends of said sheet in a coplanar attitude, with their respective top surfaces facing away from said sheet and in side-by-side relationship with their respective rear side walls facing one another in the area of the spline of the sheet, whereby when said sheet is folded about said spline back onto itself, said top surfaces of said first and second trays face one another and said first and second trays are in an overlying and registering relationship to one another, wherein a bottom wall of said first tray being orientated alongside and outside a top wall of said top surface of said second tray and wherein a bottom wall of said second tray being orientated alongside and outside a top wall of said first tray.

2. A container according to claim 1 and wherein said first and second trays include respective front side walls, and each front side wall includes a male and female latch means disposed in spaced apart relationship along said front side wall of each of said trays, said male latch means on each one of said trays being in register with registered female latch means on the other of said trays when said trays are disposed in overlying and registered relationship with one another and with their respective top surfaces facing one another.

3. A container according to claim 1 wherein said sheet material is paperboard.

4. The container according to claim 1 and including first and second latch means interposed in spaced apart relationship to one another along said front side wall of each of said first and second trays, whereby when said first and second trays are disposed in overlying and registered relationship and with their top surfaces facing one another, said first latch means of one front side wall is disposed in registration with second latch means of the other of said front side walls.

5. The container according to claim 4 wherein said first latch means includes a planar blade-type projection extending from said top surface of its respective tray, and said female latch means includes first and second planar blade-type projections extending from said top surface of its respective tray and being spaced apart from one another to define a planar space therebetween adapted to receive therein a planar blade-type projection of a male latch means.

6. The container according to claim 5 wherein when said first and second trays are disposed in overlying and registering relationship to one another and with their top surfaces facing one another, said blade-type projection of said first male latch means of said first tray is in registration with said planar space defined by said female latch means of said second tray.

7. The container according to claim 1 further comprising a generally circular depression disposed in said top surface of said first tray and wherein the generally circular depression opens outwardly from said top surface of said first tray.

8. The container according to claim 7 wherein said generally circular depression receives a removeably stored disk.

9. The container according to claim 7 wherein said generally circular depression comprises a post adapted to removeably secure a disk within said generally circular depression.

10. A container for the protective storage of recording media in the form of a disk, comprising a planar sheet of material having first and second opposite ends, and a spline defined between said opposite ends, first and second essentially identical trays, each having a top surface and respective rear side walls, affixed to respective opposite ends of said sheet in a coplanar attitude, with their respective top surfaces facing away from said sheet and in side-by-side relationship with their respective rear side walls facing one another in the area of the spline of the sheet, whereby when said sheet is folded about said spline back onto itself, said top surfaces of said first and second trays face one another and said first and second trays are in an overlying and registering relationship to one another, wherein a generally circular depression disposed in said top surface of said first tray having a post adapted to removeably secure a disk within said generally circular depression and wherein a bottom wall of said first tray being orientated alongside and outside a top wall of said top surface of said second tray and wherein a bottom wall of said second tray being orientated alongside and outside a top wall of said first tray.

* * * * *